Jan. 24, 1967     D. W. ROPER     3,300,002
BI-DIRECTIONAL ROLLER CLUTCH WITH DIFFERENTIAL
SPEED RESPONSIVE PILOT CLUTCH
Filed Feb. 27, 1964     3 Sheets-Sheet 1

INVENTOR.
DANIEL W. ROPER
BY Williams, David,
Hoffmann & Yount
ATTORNEYS

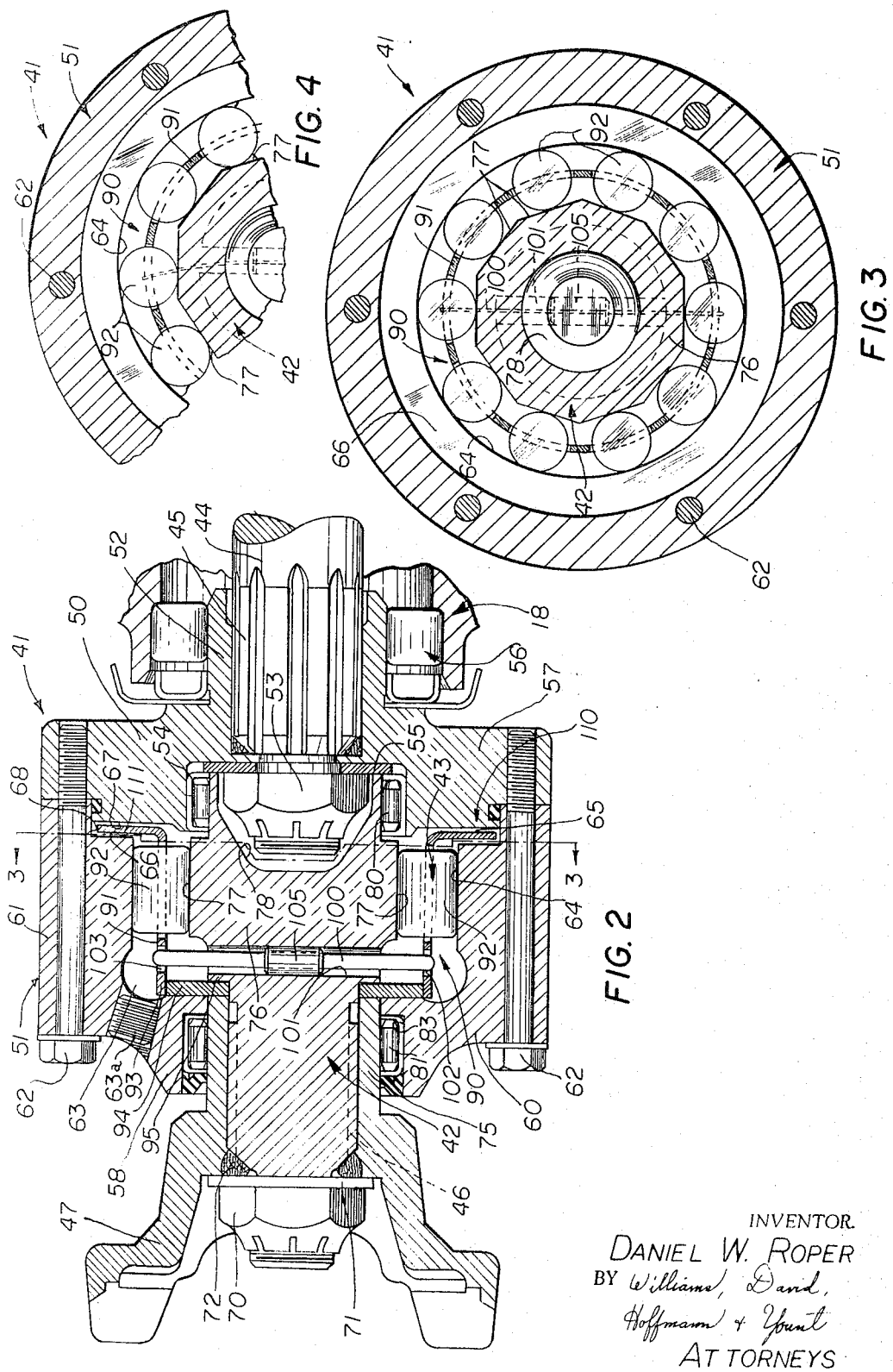

Jan. 24, 1967 D. W. ROPER 3,300,002
BI-DIRECTIONAL ROLLER CLUTCH WITH DIFFERENTIAL
SPEED RESPONSIVE PILOT CLUTCH
Filed Feb. 27, 1964 3 Sheets-Sheet 3

INVENTOR.
DANIEL W. ROPER
BY Williams, David,
Hoffmann & Yount.
ATTORNEYS

United States Patent Office 3,300,002
Patented Jan. 24, 1967

3,300,002
BI-DIRECTIONAL ROLLER CLUTCH WITH
DIFFERENTIAL SPEED RESPONSIVE PILOT
CLUTCH
Daniel W. Roper, Rochester, Mich., assignor to Eaton
Manufacturing Company, Cleveland, Ohio, a corporation of Ohio
Filed Feb. 27, 1964, Ser. No. 347,837
10 Claims. (Cl. 192—35)

This invention relates to a drive, and particularly to a drive for a vehicle which has a primary and an auxiliary set of ground engaging wheels and wherein the drive functions to normally drive the primary set of ground engaging wheels to power the vehicle normally, and automatically drives the auxiliary set of wheels upon loss of traction of the normally driven primary set of ground engaging wheels.

Known prior art vehicle drives which operate to drive a set of auxiliary drive wheels upon loss of traction or slipping of a set of primary drive wheels cause serious rocking of the vehicle. Moreover, the known vehicle drives often operate to drive the auxiliary or front wheels of the vehicle when the vehicle is going downhill and being braked by downshifting the engine. This, of course, creates problems in controlling the vehicle. Furthermore, the known prior art is relatively complex, particularly in achieving automatic driving of the auxiliary wheels upon loss of traction of the primary driving wheels when the vehicle is moving in a reverse direction, as well as in a forward direction.

Accordingly, the principal object of the present invention is the provision of a new and improved vehicle drive for normally driving a primary set of drive wheels and which is automatically operable to drive an auxiliary set of wheels upon loss of traction of the primary drive wheels, and wherein the drive is simple in construction, durable, reliable in operation, and includes a minimum of parts.

A further object of the present invention is the provision of a new and improved drive mechanism for a vehicle for normally driving the primary drive wheels of the vehicle and automatically driving an auxiliary set of wheels upon loss of traction of the primary drive wheels and which is operable to minimize engagement of the drive to the auxiliary wheels when the vehicle is moving downhill and being braked by the engine and to minimize rocking of the vehicle when the primary drive wheels are slipping.

A further object of the present invention is the provision of a new and improved drive for automatically driving an auxiliary set of drive wheels upon loss of traction of a primary set of drive wheels and wherein the drive is extremely simple and includes a coupling means operable to drive the auxiliary wheels when the primary wheels slip, and wherein the coupling means is actuated in response to a predetermined differential in speed between the input and output members of the coupling.

A further object of the present invention is the provision of a new and improved drive for automatically driving an auxiliary set of drive wheels upon loss of traction of a primary set of drive wheels including a coupling means operable to drive the auxiliary drive wheels in response to a predetermined slip speed between the coupling members and including fluid or magnetic means responsive to slip speed and operable to actuate said coupling means.

A further object of the present invention is the provision of a new and improved vehicle drive wherein an auxiliary set of ground engaging drive wheels is automatically actuated to drive the vehicle upon slipping of the primary set of ground engaging drive wheels and wherein the drive includes a coupling having coupling parts operatively connected to the primary and auxiliary drive wheels, respectively, and a double overrunning clutch means associated with the coupling parts and operable in response to relative rotation between the coupling parts to drivingly connect the coupling parts, whereby the coupling is operative to drivingly connect the coupling parts regardless of the direction in which the vehicle is being driven.

A further object of the present invention is the provision of a new and improved drive for automatically driving auxiliary wheels upon slipping or loss of traction of the primary drive wheels and wherein the drive includes a coupling having first and second coupling members and an overrunning clutch means responsive to relative rotation of the coupling members to drivingly connect the first and second coupling members and wherein the overrunning clutch means includes spring means biasing a clutch member to an operative position so that the coupling members are drivingly connected only after a predetermined differential in speed between the first and second coupling members.

A further object of the present invention is the provision of a new and improved drive for automatically driving auxiliary wheels of a vehicle upon slipping or loss of traction of normally driven wheels of the vehicle and including a clutch means for drivingly connecting the auxiliary wheels to a source of power and fluid or magnetic coupling means responsive to the relative rotation between the auxiliary and primary drive wheels to operate the clutch means.

A further object of the present invention is the provision of a new and improved drive having first and second rotatable members and coupling means operatively associated therewith and including a clutch means for drivingly connecting the rotatable members and a fluid or magnetic coupling portion responsive to a predetermined differential in speed between the rotatable members to operate the clutch means.

A further object of the present invention is the provision of a new and improved drive coupling having first and second coupling members which are relatively rotatable and a double overrunning clutch, including a plurality of rollers movable into wedging engagement with the first and second coupling members in response to relative rotational movement between the coupling members.

Further objects and advantages of the present invention will be apparent from the detailed description of a preferred embodiment thereof made with reference to the accompanying drawings forming a part of this specification and wherein:

FIG. 2 is an axial fragmentary cross-sectional view of FIG. 1 taken approximately along the section line 2—2 of FIG. 1;

FIG. 3 is a transverse cross-sectional view taken approximately along the section line 3—3 of FIG. 2;

FIG. 4 is a partial transverse cross-sectional view similar to FIG. 3 but illustrating parts in a different position;

Figure 1:
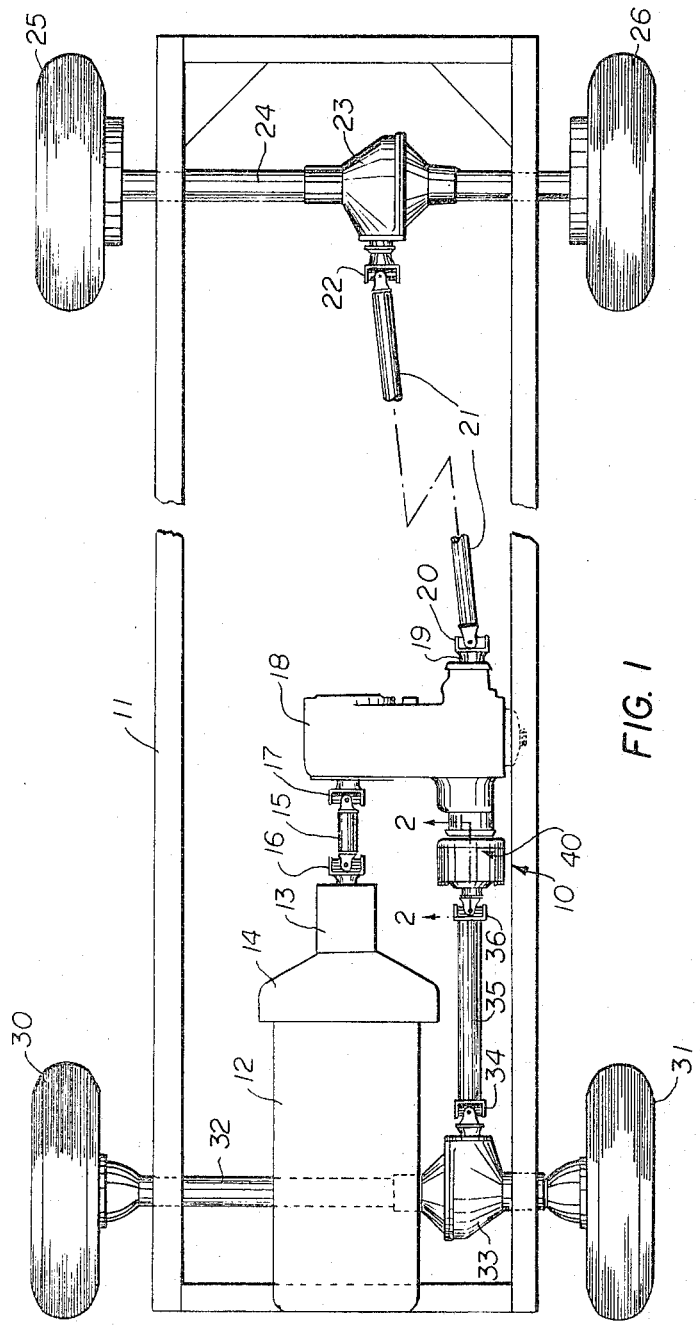
FIG. 1 is a schematic plan view of a vehicle showing the general drive arrangement therefor and embodying the present invention.

The present invention is directed primarily to a drive for a vehicle having primary and auxiliary ground engaging drive wheels where the auxiliary drive wheels are driven automatically upon loss of traction of the primary drive wheels. Such a drive may be used in any vehicle, but primarily is used in military and construction vehicles. One important use for such a drive is in Jeep vehicles so as to automatically drive the front wheels of the Jeep vehicle if the rear wheels thereof slip or lose traction, thus providing a four-wheel drive in such circumstances, and the preferred embodiment of the present invention is shown in the drawings and described hereinbelow in relation to a four-wheel drive vehicle generally designated 10.

Referring to FIG. 1, the vehicle 10 comprises a frame 11 which supports the prime mover which, in the preferred embodiment, is an internal combustion engine 12. The internal combustion engine 12 is connected to a suitable trasmission 13 through a suitable clutch assembly 14, all as is well known in the art. The transmission 13 is preferably connected to a connecting shaft member 15 through a universal coupling 16. A universal coupling 17 connects the other end of the shaft member 15 to a transfer box mechanism 18. While the transmission 13 and transfer box mechanism 18 are interconnected, as described above, it should be understood that the transmission and transfer box may be integrally disposed.

The transfer box mechanism 18 has a suitable primary output drive shaft 19 which is connected by a universal coupling 20 to a propeller shaft 21. The end of the shaft 21, opposite the end connected to the coupling 20, is connected by a universal coupling 22 to a differential mechanism 23 for driving the rear axle 24 of the vehicle 10. The rear axle 24 of the vehicle 10 carries the primary drive wheels 25, 26 at its opposite ends. In the preferred embodiment, the primary drive wheels 25, 26 form the rear drive wheels of the vehicle 10.

The vehicle 10 also includes an auxiliary set of drive wheels, or front wheels, 30, 31 supported on opposite ends of the front axle 32 which is supported by the frame 11 of the vehicle 10. The front wheels 30, 31 or auxiliary drive wheels are normally not driven. However, they are driven under conditions as will be described hereinbelow. A differential drive mechanism 33 is associated with the front axle 32, and the differential drive mechanism 33 is connected through a universal coupling 34 to a propeller shaft 35. The differential drive mechanism 33 is of the same drive ratio as the differential drive mechanism 23. The end of the propeller shaft 35 opposite the end connected to the universal coupling 34 is connected through a universal coupling 36 to a coupling mechanism 40 which is operatively associated with the transfer box 18, as will be described hereinbelow.

The transfer box 18 may be of any suitable construction. Preferably, the transfer box 18 is of the type which includes suitable gearing and drive connections for normally driving the drive shaft 21 to drive the rear or primary drive wheels 25, 26 of the vehicle, and which is operable upon manual control to drive the front wheels 30, 31 of the vehicle as well as the rear wheels 25, 26 through the coupling 40, shaft 35, and differential drive mechanism 33. In view of the fact that the transfer box mechanism may be of any conventional structure and forms no part of the present invention, the specific details of the transfer box 18 will not be described herein in detail.

This drive for the vehicle 10 is operable to drivingly engage the auxiliary drive wheels 30, 31 upon slipping or a loss in traction of the primary drive wheels 25, 26. Under normal driving conditions, the drive wheels 25, 26 are ground engaging wheels and drive the vehicle. The wheels 30, 31 are also ground engaging wheels and thus are in a sense geared to the wheels 25, 26 and rotate at the speed of the drive wheels 25, 26. In view of the fact that the primary drive wheels 25, 26 and the auxiliary drive wheels 30, 31 rotate normally at the same speed, the axles 32, 24 also rotate at approximately the same speed, and since the differential drive mechanisms 23, 33, respectively, are of the same gear ratio, the shafts 35 and 21 rotate at approximately the same speed.

Under normal driving conditions, the coupling 40 permits the shaft member 35 to "free wheel" with respect to the drive mechanism in the transfer box 18 and the shaft member 21, as will be described hereinbelow. However, upon rotation of the shaft 21 relative to the shaft 35, as by slipping of the drive wheels 25, 26, the coupling 40 functions to drivingly connect the shaft 35 to the drive mechanism of the transfer box 18 to thus positively drive the shaft 35 and the auxiliary wheels 30, 31 at the same time that the drive wheels 25, 26 are being driven, thus automatically providing a four-wheel drive when the shaft 21 rotates relative to the shaft 35. It should be apparent that the shaft 21 will rotate relative to the shaft 35 under those conditions wherein the primary drive wheels 25, 26 slip or lose traction and thus rotate relative to the drive wheels 30, 31. More specifically, if the drive wheels 25, 26 slip or lose traction, the drive wheels 25, 26 continue to rotate through the drive from the transfer box 18. However, since the wheels 25, 26 are slipping rather than driving the vehicle along the ground, the wheels 30, 31 are rotating at a slower speed than the drive wheels 25, 26, or are stationary. In this event, upon a predetermined amount of rotation of the primary drive wheels 25, 26 relative to wheels 30, 31 the coupling 40 is operative to drivingly connect the front or auxiliary drive wheels 30, 31 to the transfer box mechanism 18, thus rendering the vehicle automatically a four-wheel drive vehicle.

The coupling 40, as shown in FIG. 2, comprises a pair of coupling members 41, 42, and a coupling means 43 interposed between the coupling members 41, 42. The coupling member 41 is connected through a spline connection generally designated 45 to a shaft 44 which is driven by the transfer box mechanism 18 at the same speed as the drive shaft 21. The coupling member 42 is connected through a suitable spline connection, designated 46, to a part 47 of the universal connection 36 which is rotated at the speed of the drive shaft 35. From the above description, it is apparent that the coupling member 42 rotates at the speed of rotation of the shaft 35 and that the coupling member 41 rotates at the speed of rotation of the shaft 44. As will be apparent from the description hereinbelow, the coupling means 43 functions to permit "free wheeling" of the coupling member 42 relative to the coupling member 41 under normal driving conditions and drivingly connects the coupling member 41 to the coupling member 42 upon slip of the rear wheels 25, 26 which results in rotation of the shaft member 44 relative to the shaft member 35, and in turn, rotation of the coupling member 41 relative to the coupling member 42.

The coupling member 41 is in the form of a housing and comprises an adapter flange member 50 and a housing member 51. The adapter flange member 50 has a hub portion 52 which is splined to the shaft 44 and provides the spline connection therebetween. The adapter flange member 50 is held on the shaft 44 by a nut member 53 which is threaded onto the outer end of the shaft 44 and is located in a centrally located recess 54 in the flange member. A suitable thrust washer 55 is positioned between the nut member 53 and the bottom of the recess 54. The nut member 53 holds the flange member 50 in engagement with a bearing assembly 56 which is located in the housing of the transfer box 18 and engages and supports the hub portion 52 of the flange member 50.

The adapter flange member 50 also includes a radially extending flange portion 57 which extends from the hub portion 52 radially outwardly thereof. The housing member 51 is adapted to interfit with the projecting flange portion 57 of the adapter flange 50 and be secured thereto. The housing portion 51 also includes a hub portion 58 having an opening extending therethrough, a radially extending portion 60 connected at one end to the hub portion 58, and an axially extending portion 61 which is adapted to interfit with the adapter flange member 50. The housing member 51 and adapter flange member 50 are secured together by suitable bolts 62 which extend through aligned openings therein.

As stated hereinabove, the housing member 51 and adapter flange 50 cooperate to provide a suitable housing, and the housing member 51 and adapter flange 50 define a chamber 63 therein. A passageway through the radially extending portion 60 of the housing member 51 communicates with the chamber 63 and a threaded plug member 63a is positioned in said passageway and removable therefrom so as to permit filling the chamber with a silicone fluid for purposes to be described hereinbelow. The chamber 63 is defined in part by an axially extending annular surface 64 on the inner portion of the housing member 51. The chamber 63 also includes a radially extending narrow chamber portion 65 located at one end of the chamber 63 and specifically at the right end thereof as shown in FIG. 2 and which receives silicone fluid.

The chamber portion 65 is defined by axially spaced substantially parallel surface portions 66, 67 on the housing member 51 and adapter flange member 50, respectively. The surface portions 66, 67 abut an axially extending short surface portion 68 of the housing member 51 to define the chamber portion 65 which forms a narrow channel extending radially from the chamber 63 at one end portion thereof, for a purpose to be described hereinbelow.

The coupling member 42 comprises a shaft-like member connected at one end, as stated hereinabove, to the universal joint part 47 through the spline connection 46. The universal joint part 47 is held on the shaft member 42 and in driving engagement therewith by a suitable nut member 70 which is threaded onto one end portion of the coupling member 42, namely, the left end portion of the coupling member 42, as shown in FIG. 2. A suitable washer member 71 is interposed between the nut member 70 and the universal part 47, and a suitable O-ring seal 72 is provided between the washer member 71 and the shaft member 42 and the universal joint part 47. The universal joint part 47 includes an axially extending portion 75 which encircles one portion of the coupling member 42 and extends into the opening in the hub portion 58 of the housing member 51.

The other end portion of the coupling member 42, namely, the end opposite the end connected to the universal joint part 47, extends into the chamber 63 and includes an enlarged portion 76 having a plurality of straight surface portions 77 forming the outer periphery thereof. The extreme right end of the second coupling member has a suitable recess 78 therein for receiving the nut member 53 which secures the adapter flange member 50 on the shaft 44.

The coupling member 41 is supported for rotation relative to the coupling member 42, and to this end, a pair of needle bearings 80, 81 are interposed between the coupling members. The needle bearing 80 is supported in the recess 54 in the flange member 50 and includes bearing members which engage the extreme right end portion of the second coupling member 42. The needle bearing 81 is positioned in a counterbore 83 in the hub portion 58 of the housing member 51 and includes bearing members which engage the outer portion 75 of the universal joint part 47. From the above description therefor, it can be readily seen that the coupling member 41 is rotatable relative to the coupling member 42.

The coupling means 43 is operable upon relative rotation between the coupling members 41, 42 to drivingly connect the coupling members 41, 42 so as to transmit torque from the shaft member 44 to the coupling member 42 and to the front wheels or auxiliary drive wheels 30, 31 of the vehicle 10. The coupling means 43 comprises a double overrunning clutch means 90. The double overrunning clutch means 90 comprises a roller cage 91 and a plurality of rollers 92 rotatably supported by the roller cage. The number of rollers 92 supported by the roller cage 91 correspond in number to the flat surface areas 77 extending around the periphery of the coupling member 42. Each roller 92 is engageable with one surface 77 of the coupling member 42, and also is engageable with the surface 64 of the housing member 51.

The roller cage 91 is movable from a position shown in FIG. 3 wherein the rollers 92 permit "free wheeling" of the coupling 42 relative to the coupling 41 to the position shown in FIG. 4 wherein the rollers 92 wedgingly engage surfaces 64 and 77 and drivingly connect the coupling members to provide a drive therebetween. The roller cage 91 includes an axially extending portion 93 which extends towards the left from the rollers 92 as viewed in FIG. 2. The extreme left-end portion of the portion 93 of the roller cage 91 is supported on a suitable thrust washer 94 which is clamped between a shoulder 95 of the coupling member 42 and the end of the portion 75 of the universal joint part 47. The roller cage 93 is rotatable relative to the thrust bearing 94 even though it is supported thereby.

The coupling means 43 also includes a suitable biasing means for biasing the coupling means to permit the "free wheeling" of the coupling member 42 relative to the coupling member 41. This biasing means comprises a suitable spring means 100 which biases the roller cage 91 and rollers 92 carried thereby into the position shown in FIG. 3 wherein the rollers 92 are located so that a radial line extending through the center of rotation of the coupling member 42 and through the center of rotation of the rollers 92 intersects the point of engagement of the rollers 92 with the surface 77. In this position, a slight amount of clearance is provided between the rollers 92 and the surfaces 64, 77. Thus, the coupling member 42 is free to rotate or "free wheel" relative to the coupling member 41. The spring means 100 comprises a leaf spring member which extends through a hole or passageway 101 provided in the coupling member 42. The opposite ends of the leaf spring engage in slots 102, 103, respectively, in the portion 93 of the roller cage 91. The central portion of the spring 100 extends through and is engaged in a plug or clamp means 105 which is positioned in the opening 101 and holds the leaf spring member in a substantially straight radially extending position. Thus, it can be seen that the spring 100 biases the clutch means 90 into the position shown in FIG. 3, and that upon any movement of the rollers relative to the shaft member 42, the spring means 100 is bent and urges the clutch means 90 to return to its normal or central position relative to the coupling member 42, shown in FIG. 3. Moreover, it should be apparent that the spring 100 is rotated with the coupling member 42, and since its outer ends engage slots in the roller cage 91, the roller cage 91 and rollers 92 likewise rotate with the coupling member 42.

The coupling means 43 further preferably comprises viscous drive coupling means 110 for moving the clutch means 90 relative to the coupling member 42 against the biasing means 100 and in response to a predetermined differential in speed between the coupling members 41, 42, commonly referred to as "slip speed." The viscous drive coupling means 110 is provided by a radially extending flange portion 111 of the roller cage 91 which extends into the narrow chamber 65 which forms a viscous shear chamber for the viscous coupling 110. Upon rotation of the surface portions 66, 67 of the coupling member 41 relative to the flange portion 111, a viscous drag is established therebetween through the action of the viscous shear fluid in the shear chamber 65. This viscous drag when sufficient to overcome the biasing spring 100 causes the flange portion 111 of the clutch means 90 to move relative to the coupling member 42 causing the rollers 92 to move from the position shown in FIG. 3 to the position shown in FIG. 4 wherein the rollers are in wedging engagement with the surfaces 64, 77 of the coupling members, respectively, and provide for a positive drive connection therebetween. The rollers 92 are held in wedging engagement with the surfaces 64, 77 of the coupling members by the torque transmitted by the clutch means 90. The rollers 92 remain in wedging engagement, therefore, until the torque is removed.

From the above description, the operation of the preferred embodiment of the present invention should be clear. Under normal driving conditions, the rear wheels 25, 26 of the vehicle drive the vehicle and the coupling member 42 is permitted to "free wheel" with respect to the coupling member 41 through the provision of the overrunning clutch means 90 and the needle bearings 80, 81 which support the coupling members for relative rotation. It should be apparent that under normal driving conditions, the parts illustrated in FIG. 2 are rotating at substantially the same angular velocity and the position of the rollers 92 is as is illustrated in FIG. 3.

When the rear drive wheels 25, 26 slip, the shaft member 44 and coupling member 41 connected therewith continue to rotate at the speed at which they are driven. However, the auxiliary or front wheels 30, 31 are slowed relative to the rear wheels, and the coupling member 42 is thus slowed relative to the coupling member 41. Moreover, the roller cage 91 and the rollers 92 are slowed down with respect to the coupling member 41. Thus, the surfaces 66, 67 of the coupling member 41 rotate faster than the flange portion 111 of the cage 91. When the differential speed or slip speed between the surfaces 66, 67 and roller cage flange 111 is of a predetermined magnitude, the viscous drive coupling 110 causes the cage 91 to move relative to the coupling member to the position illustrated in FIG. 4 and causes wedging engagement of the rollers 92 with the surfaces 77, 64, respectively, to positively drive the front wheels of the vehicle. This operation would occur regardless of the direction of rotation of the coupling members, and thus regardless of whether the vehicle is being driven in a reverse or a forward direction.

It should be apparent from the above description that the coupling 40 which is responsive to slipping of the rear wheels 25, 26 to drive the front wheels 30, 31 operates only after a predetermined amount of slipping of the rear wheels occurs. Thus, the coupling 40 does not constantly and repetitively engage and disengage the drive to the front wheels of the vehicle when the rear wheels slip with the resulting rocking of the vehicle, as in known prior art drives, but rather engages only in response to a predetermined differential in speed between the input and output coupling members. Moreover, the coupling does not operate to drive the front wheels of the vehicle when the vehicle is moving downhill and being braked by the engine unless the rear wheels slip.

While the preferred embodiment of the present invention has been described hereinabove as including a viscous coupling means responsive to the differential in speed between the input and output coupling members 41, 42 to actuate the clutch means 90, various other means may be utilized to actuate the clutch means 90 in response to a predetermined differential in speed between the coupling members. FIGS. 5–9 of the drawings illustrate various modifications utilizing different fluid and magnetic means operable as a substitute for the viscous coupling shown in FIGS. 1–4. Each of the modifications will be described hereinbelow and the reference numerals used to designate parts of the structure shown in FIGS. 1–4 will be used to designate similar parts in the structures shown in FIGS. 5–9.

Figures 5, 6:
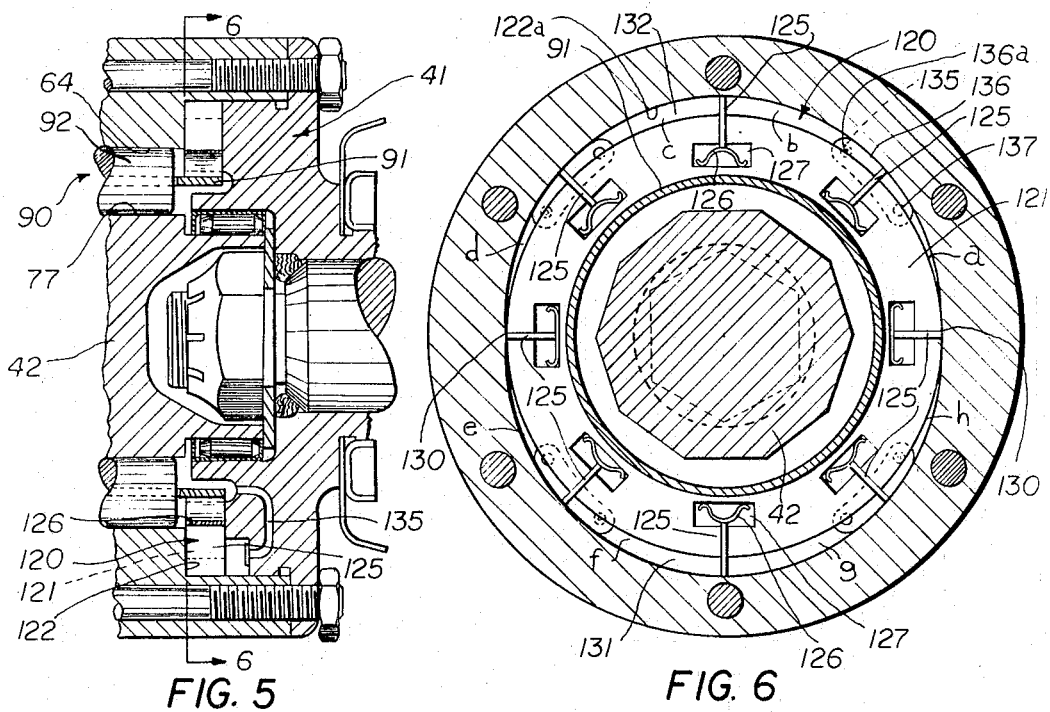
FIG. 5 is an axial fragmentary sectional view, similar to FIG. 2, of a modified apparatus embodying the present invention.
FIG. 6 is a transverse cross section of the apparatus shown in FIG. 5 taken approximately along section line 6—6 of FIG. 5.

The modification shown in FIGS. 5 and 6 includes a hydraulic pump means 120 which is operative to actuate the clutch means 90 to move the rollers 92 thereof into wedging engagement with the surfaces 77 and 64 of the coupling members 42 and 41. The hydraulic pump means 120 includes a circular disk portion 121 connected to the roller cage 91 and extending into a narrow annular channel 122 defined by adjacent surface portions of the coupling member 41. The channel 122 is defined in part by an axially extending annular elliptical wall 122a of the member 41 and thus is elliptical in shape as shown in FIG. 6. The disk portion 121 engages diametrically opposite surface portions 130 of the channel 122.

The disk portion 121 carries a plurality of radially slidable vane members 125 which are equally spaced circumferentially of the disk portion 121. Each vane member 125 is slidably received in a slot in the disk portion 121 and is biased outwardly of the disk member 122 by a suitable leaf spring member 126 which is positioned in an opening 127 in the disk member. The vane members 125 engage the annular elliptical wall 122a and thus divide the channel 122 into a plurality of pumping pockets designated "a" to "h."

Fluid is provided in the fluid pumping pockets by means of a plurality of fluid conduits 135 formed in the coupling member 41. As shown in FIG. 6, the fluid conduits 135 are spaced around the member 41. Each of the fluid conduit means 135 communicates with the channel 122 and with the fluid chamber 63. As shown in FIG. 6, there are four fluid conduit means 135 spaced around the member 41. A reed valve member 136 is associated with each of the fluid passageways 135 and are secured to the member 41 by rivets 137, respectively, and extend so that the free end of the reed valve covers the opening of passageway 135 into channel 122. A small orifice opening 136a is provided in each of the reed valve members 136 and communicates the chamber 122 with the passageway 135 through the reed valve.

From the above description, it should be apparent that when the coupling members 41, 42 rotate at approximately the same speed, the surface 122a does not move relative to the vanes 125 and no fluid pumping action occurs. Upon rotation of the input coupling member 41 relative to the output coupling member 42, as would occur when the rear wheels of the vehicle slip, as described above, the volume of the fluid pumping pockets changes. The volume of the pumping pockets "a," "b," "e" and "f" tends to decrease, while the volume of the pumping pockets "c," "d," "g" and "h" tends to increase. Under normal driving conditions, when the input coupling member 41 and the output coupling member 42 are rotating at the same speed, fluid is located in and fills each of the pumping pockets. The changing of the volume of the pumping pockets causes the reed valves 136 associated with the pumping pockets and increasing in size to open and fluid to be drawn through the inlet ports 135 into those pumping pockets, while those pumping pockets which are decreasing in size tend to force fluid therefrom through the small opening 136a in the reed valves and the fluid conduits 135. The openings 136a are so sized as to provide a controlled rate of flow from the pumping pockets which are decreasing in size. Thus, if the input coupling member 41 is rotating relative to the vanes 125 at a relatively slow speed, the volume of the pumping pockets varies at a slow rate and fluid which is forced from those pumping pockets which are decreasing in size as the member 41 rotates can flow out of the openings 136a and into the chamber 63.

However, if the speed of the input coupling member 41 increases relative to the output coupling member 42, the rate of change in the volume of the pumping pockets which are decreasing in size is relatively great. Since the pumping pockets are decreasing in size at a relatively rapid rate, all of the fluid cannot flow through the openings 136a and, as a result, the disk 121 and input coupling member 41 tend to lock together by the action of the fluid therebetween causing the disk member 121 to rotate with the input coupling member 41. When the disk member 121 rotates with the input coupling member 41, the roller cage 91 is moved so as to cause the rollers 92 carried thereby to move into wedging engagement with surfaces 77 and 64 of the output and input coupling members, respectively. As described above, this causes the front wheels of the vehicle to be driven as well as the back wheels. While, as described above, the openings 136a in the reed valve provide for a controlled outlet fluid flow, the openings can be eliminated and leakage be permitted around the reed valve member 136 to an extent to provide the same function.

Figures 7, 8:
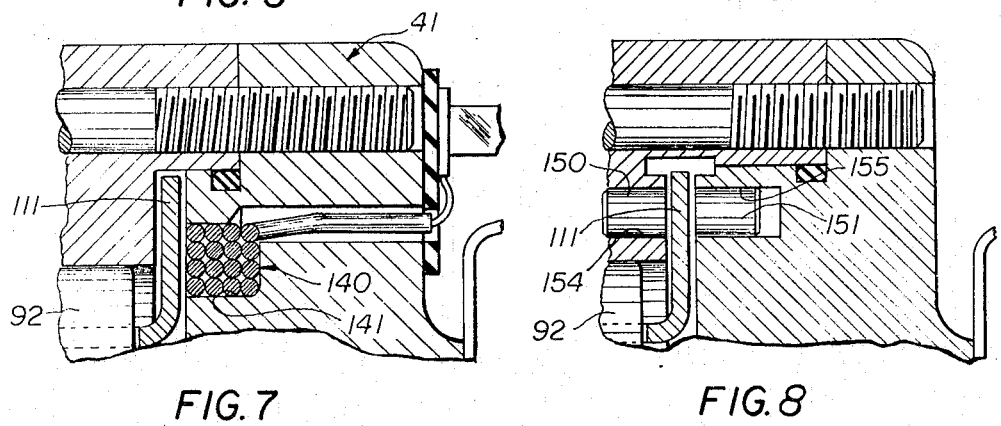
FIGS. 7, 8 and 9 are fragmentary sectional views illustrating various further modifications embodying the present invention.

The modifications shown in FIGS. 7 and 8 include magnetic means for providing a magnetic means for providing a magnetic field in which the flange portion 111 of the roller cage 91 is positioned. The modification shown in FIG. 7 includes an electromagnetic means for providing the magnetic field. The electromagnetic means includes a suitable electrical coil 140 positioned in a recess 141 in the input coupling member 41. The coil 140 is suitably connected with a source of current so as to energize the coil 140. Upon energization of the coil 140, a magnetic field is created thereby in which the flange portion 111 of the roller cage 91 is positioned. Upon relative movement of the input coupling member 41 and the output coupling member 42, as when the rear wheels of the vehicle slip, the magnetic field in which the flange portion 111 is positioned will be moved or rotated relative to the flange portion 111. This, as is well known, tends to move the disk member 121 and the force tending to move the disk member 121 increases as the rotation of the member 41 increases. This force when it becomes sufficient to overcome the spring 100 causes the flange portion 111 to move and causes engagement of the rollers 92 with the surfaces 64 and 77, as described hereinabove.

The magnetic means embodied in the modification shown in FIG. 8 is of the permanent magnet type and includes a pair of magnets 150 and 151 positioned on opposite sides of the flange portion 111 of the roller cage 91 in suitable recesses 154, 155, respectively. These magnets create a magnetic field in which the flange 111 is positioned and upon movement of the magnetic field, causes the flange 111 to move therewith, as described above in connection with the modification shown in FIG. 7.

Figure 9:
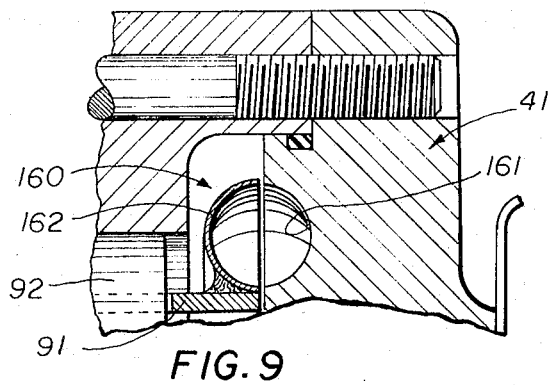

The modification shown in FIG. 9 includes a fluid coupling means 160 which is responsive to a predetermined differential in speed between the input and output coupling members to effect actuation of the clutch means 90. The fluid coupling means 160 comprises a pair of cooperating fluid coupling members 161 and 162. The coupling member 161 is provided by a portion of the coupling member 41, in which portion an annular concave recess is formed and which includes fluid impeller blades. The coupling member 162 is secured to the roller cage 91 and extends in an annular facing relation to the recess formed in the coupling member 41. A suitable fluid medium is provided in the chamber 63 adjacent to the coupling members. Upon rotation of the input coupling member 41 relative to the output coupling member 42, the input coupling member 161 moves or rotates relative to the output coupling member 162. The impeller blades act on the fluid in the chamber defined by the coupling members 161, 162 in a well-known manner to tend to rotate the coupling member 162 with the member 41. When the speed differential between the coupling members 161 and 162 reaches a predetermined point, the coupling member 162 moves against the bias of the spring 100 causing the roller cage to be moved about the axis of the coupling members and causing the clutch means 90 to be operated to engage and drivingly connect the front wheels of the vehicle.

While the present invention has been described hereinabove in considerable detail and many modifications have been shown and described, it should be apparent that other changes, modifications, and adaptations thereof may be made by those skilled in the art, and it is intended to hereby cover all changes, modifications, and adaptations thereof coming within the scope of the appended claims.

Having described my invention, I claim:

1. A drive comprising first and second relatively rotatable members, first and second shaft members connected to said first and second members, respectively, for independently rotating said members, double overrunning clutch means carried by said first member for rotation therewith and operatively associated with said first and second members and operable between a first position providing for free wheeling of one of said members relative to the other member and a second position wherein said clutch means drivingly connects the first and second members, means for biasing said clutch means toward its said first position and fluid actuating means operatively associated with said first and second members and said clutch means and responsive to a predetermined differential in the speed between said first and second members to overcome said biasing means and move said clutch means to its said second position, said actuating means including a flange member on said clutch means extending toward a surface of said second member and a viscous fluid associated with said flange member and said surface and having a resistance to motion between said flange member and said surface which increases to said predetermined differential in speed and overcomes said biasing means at said predetermined speed.

2. A drive mechanism comprising first and second relatively rotatable coupling members, first and second shaft members connected to said first and second coupling members, respectively, for rotating said coupling members, clutch means operatively associated with said first and second coupling members and rotatable therewith, said clutch means having a first position relative to said coupling members providing for free wheeling of said first coupling member relative to said second coupling member and a second position drivingly connecting said first and second coupling members, spring means biasing said clutch means to its said first position, and viscous drive coupling means operatively associated with said first and second coupling members and said clutch means and responsive to rotation of said second coupling member relative to said first coupling member to overcome said biasing means and move said clutch to its said second position, said viscous drive coupling means comprising a viscous shear space defined by said second coupling member and an actuating member connected to said clutch means and extending into said shear space and movable by the shear action of the shear fluid in said shear space upon relative movement of said second coupling member and said actuating member to shift said clutch means to its second position.

3. A drive for use in a vehicle comprising first and second relatively rotatable members adapted to be drivingly connected with separate wheels of the vehicle, clutch means operatively associated with said first and second members to drivingly connect said first and second members and operable from an engaged position wherein said first and second members are drivingly connected by said clutch means to a disengaged position wherein said first and second members are not drivingly connected by said clutch means, means biasing said clutch means to its disengaged position, actuating means operatively associated with said first and second members and with said clutch means and responsive to a predetermined differential in the speed between said first and second members to overcome said biasing means and move said clutch means to its said engaged position, said clutch means carried on said first member for rotation therewith and said actuating means including a flange member connected to said clutch means and extending closely adjacent a surface of said second member, and means associated with said flange member and said second member providing a resistance to motion between said flange member and said surface which increases with slip speed and overcomes said biasing means at said predetermined differential in speed to provide for said movement of said clutch means to said engaged position.

4. A drive coupling comprising first and second relatively rotatable coupling members, clutch means operatively associated with said first and second coupling members and operable from a first position providing for free wheeling of one of said coupling members relative to the other coupling member to a second position wherein said clutch means drivingly connects the first and second coupling members, spring means biasing said clutch means to its said first position, actuating means operatively associated with said first and second coupling members and said clutch means and responsive to a predetermined slip speed between said first and second coupling members to overcome said biasing means and move said clutch means to its said second position, said clutch means being carried by said first member for rotation therewith and said actuating means including a flange member connected to said clutch means and extending toward a surface of said second member, and means associated with said flange member and said second member providing a resistance to relative motion between said flange member and said surface which increases with slip speed and overcomes said spring means at said predetermined slip speed to provide for movement of said clutch means to its engaged position.

5. A drive coupling as defined in claim 4 wherein said means associated with said flange member and said second member is a magnetic means operable to provide a magnetic field between said surface of said second member and said flange member with said magnetic field operable to provide said resistance to motion.

6. A drive coupling as defined in claim 5 wherein said magnetic means includes an electromagnetic coil operable to provide an electromagnetic field between said surface of said second member and said flange member.

7. A drive coupling as defined in claim 5 wherein said magnetic means includes a permanent magnet.

8. A drive coupling comprising first and second relatively rotatable coupling members, clutch means operatively associated with said first and second coupling members and operable between a first position providing for free wheeling of one of said coupling members relative to the other member and a second position wherein said clutch means drivingly connects the first and second coupling members, spring means biasing said clutch means to its said first position, actuating means operatively associated with said first and second coupling members and said clutch means and responsive to a predetermined slip speed between said first and second coupling members to overcome said biasing means and move said clutch means to its said second position, said clutch means being carried by said first member for rotation therewith and said actuating means including a member connected to said clutch means and extending toward a surface of said second coupling member, and means associated with said member connected to said clutch means and said second member providing a resistance to relative motion between said member connected to said clutch means and said surface which increases with slip speed and overcomes said spring means at said predetermined slip speed to provide for movement of said clutch means to its engaged position.

9. A drive coupling as defined in claim 8 and wherein said actuating means comprises hydraulic pump means with said surface of said second coupling member defining a noncircular chamber in said second coupling member and said member connected to said clutch means is a circular disc member positioned in said chamber, and further including vane members carried by said disc member engaging said surface and dividing said chamber into a plurality of pumping pockets, the size of certain of said pumping pockets increasing as said coupling member rotates relative to said disc member and the size of other of said pumping pockets decreasing as said second coupling member rotates relative to said disc member, fluid conduit passage means communicating with said pockets and directing fluid from said pockets which are decreasing in size and into said pockets increasing in size so as to provide a fluid flow upon rotation of said second coupling member relative to said disc member.

10. A drive coupling as defined in claim 8 and wherein said member connected to said clutch means includes a concave surface and said surface of said second coupling member is a concave surface and wherein said concave surfaces form portions of a fluid coupling operatively associated with the clutch means to actuate the clutch means upon a predetermined amount of relative rotation between the surfaces.

References Cited by the Examiner

UNITED STATES PATENTS

| | | | |
|---|---|---|---|
| 2,105,918 | 1/1938 | Herrington | 180—44 |
| 2,107,072 | 2/1938 | Herrington | 74—371 |
| 2,185,636 | 1/1940 | Kysor | 180—44 |
| 2,292,988 | 8/1942 | Bloomfield et al. | 192—45 |
| 2,504,481 | 4/1950 | Zingsheim | 192—45 |
| 2,699,852 | 1/1955 | Cost | 192—46 |
| 2,796,941 | 6/1957 | Hill | 180—44 |
| 2,796,942 | 6/1957 | Hill | 180—44 |
| 2,851,115 | 9/1958 | Buckendale | 74—700 |
| 3,055,471 | 9/1962 | Warm et al. | 192—45 |
| 3,107,763 | 10/1963 | Hill | 192—41 |
| 3,123,169 | 3/1964 | Young et al. | 194—40 |

FOREIGN PATENTS 727,917    4/1955   Great Britain.

DAVID J. WILLIAMOWSKY, *Primary Examiner.*

LEO FRIAGLIA, *Examiner.*

W. A. MARCONTELL, *Assistant Examiner.*